(12) United States Patent
Sugiura

(10) Patent No.: US 7,397,483 B1
(45) Date of Patent: Jul. 8, 2008

(54) IMAGE DATA CONVERSION USING INTERPOLATION

(75) Inventor: Hiroaki Sugiura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,917

(22) Filed: Jun. 30, 1999

(30) Foreign Application Priority Data

Jul. 2, 1998 (JP) ................................. 10-187739

(51) Int. Cl.
G09G 5/00 (2006.01)
G03F 3/08 (2006.01)
H04N 1/46 (2006.01)
G06F 15/00 (2006.01)
G06K 1/00 (2006.01)

(52) U.S. Cl. .................. 345/660; 358/518; 358/519; 358/520; 358/521; 358/522; 358/523; 358/524; 358/525; 358/1.9

(58) Field of Classification Search ................. 345/601, 345/602, 603, 604, 605, 600, 606, 781, 964, 345/421, 422, 423, 659, 660; 358/1.5, 1.9, 358/518–525; 708/290, 205; 327/361; 382/162–167, 382/293–302
See application file for complete search history.

(56) References Cited

U.S. PATENT DOCUMENTS

| | | | | |
|---|---|---|---|---|
| 4,275,413 A | * | 6/1981 | Sakamoto et al. | 358/525 |
| 4,477,833 A | | 10/1984 | Clark et al. | 358/80 |
| 4,511,989 A | * | 4/1985 | Sakamoto | 708/290 |
| 5,045,732 A | * | 9/1991 | Sugiura et al. | 327/309 |
| 5,390,035 A | * | 2/1995 | Kasson et al. | 358/518 |
| 5,537,520 A | * | 7/1996 | Doi et al. | 345/422 |
| 5,581,376 A | * | 12/1996 | Harrington | 358/518 |
| 5,592,591 A | * | 1/1997 | Rolleston | 358/1.5 |

(Continued)

FOREIGN PATENT DOCUMENTS

EP 0 923 049 6/1999

(Continued)

OTHER PUBLICATIONS

Kasson, et al., "Performing color space conversions with three-dimensional linear interpolation", Journal of Electronic Imaging, vol. 4, No. 3, Jul. 1995, pp. 226-249.

(Continued)

*Primary Examiner*—Jin-Cheng Wang
(74) *Attorney, Agent, or Firm*—Fitzpatrick, Cella, Harper & Scinto

(57) ABSTRACT

In tetrahedral interpolation suitable for data conversion implemented by digital computations, when the unit rectangular hexahedron is a regular hexahedron, no complicated multiplication is required, and the computation volume can be greatly reduced. However, when the unit rectangular hexahedron is not a regular hexahedron, since a complicated multiplication is required, the computation volume increases considerably. To avoid this, after the grid spacing is set (S1), X-u', Y-v', and Z-w' tables for obtaining the positions of an input value with respect to normalized grid points are prepared (S2-S4). Subsequently, image data is input (S5), and u', v', and w' corresponding to the input image data are obtained using the prepared tables (S6). The relationship among u', v', and w' is determined (S7), and data-converted image data is calculated using an equation corresponding to the determination result (S8).

8 Claims, 9 Drawing Sheets

U.S. PATENT DOCUMENTS

| | | | | |
|---|---|---|---|---|
| 5,644,509 | A | * | 7/1997 | Schwartz .................... 358/518 |
| 5,710,709 | A | * | 1/1998 | Oliver et al. ................ 700/184 |
| 5,715,376 | A | * | 2/1998 | Nakayama ................. 358/1.9 |
| 5,748,195 | A | * | 5/1998 | Nin ............................ 345/604 |
| 5,780,759 | A | | 7/1998 | Szalay ......................... 84/454 |
| 5,883,821 | A | * | 3/1999 | Komaki ...................... 708/290 |
| 5,926,559 | A | | 7/1999 | Ohta ........................... 382/162 |
| 6,118,549 | A | * | 9/2000 | Katougi et al. ............... 358/1.9 |
| 6,204,939 | B1 | * | 3/2001 | Lin et al. .................... 358/518 |
| 6,466,333 | B1 | * | 10/2002 | Schoolcraft et al. .......... 358/1.9 |

FOREIGN PATENT DOCUMENTS

| | | |
|---|---|---|
| GB | 1 595 122 | 8/1981 |
| JP | 53-123201 | 10/1978 |
| JP | 7-131668 | 5/1995 |
| JP | 8237497 | 9/1996 |
| JP | 9-022298 | 1/1997 |
| JP | 9-231054 | 9/1997 |
| JP | 10-70669 | 3/1998 |

OTHER PUBLICATIONS

Hung, Po-Chieht "Colorimetric calibration in electronic imaging devices using a look-up-table model and interpolations", Journal of Electronic imaging, vol. 2, No. 1, Jan. 1993, pp. 53-61.

Omondi, Amos R., "Computer Arithmetic Systems", Prentice Hall, Cambridge, ISBN 0-13-334301-4 XP-002188282, Chapter 5.1, p. 293, line 1 to p. 296, line 5; and Chapter 5.5.1, p. 308, lines 13-28.

Rickey, Daniel W., "Getting a Speed Boost with Fixed-Point Math", MacTech, vol. 13, No. 11, Nov. 1997.

Office Action, dated Aug. 31, 2004, in EP 99 305 142.4.

U.S. Appl. No. 09/342,916, filed Jun. 30, 1999, Sugiura.

* cited by examiner

120
IMAGE DATA CONVERSION USING INTERPOLATION

BACKGROUND OF THE INVENTION

1. Field of the Invention

The present invention relates to a data conversion apparatus and its method and, more particularly, to a data conversion method suitable for digital arithmetic operations, and a data conversion apparatus using the method.

2. Description of the Related Art

The volume of image data digitally processed by computers and the like is increasing each year. Also, higher quality upon forming a color image is increasingly required each year. In order to form a high-quality color image, color conversion is indispensable, and requires high-speed processing in addition to high precision and implementation of flexible conversion characteristics.

Since color information generally forms a three-dimensional space, color conversion determines the correspondence of color information from a given color space to another color space. Many schemes for attaining such conversion are available. Among these schemes, color conversion that combines a look-up table (LUT) and interpolation (Japanese Patent Laid-Open Nos. 53-123201 and 8-237497) is prevalently used. Also, color conversion that combines an LUT and interpolation includes various schemes. In consideration of the required data size, computation volume, continuity of outputs among unit rectangular hexahedra, gray line interpolation characteristics, and the like, tetrahedral interpolation disclosed in Japanese Patent Laid-Open No. 53-123201 is most suitable.

However, the tetrahedral interpolation disclosed in Japanese Patent Laid-Open No. 53-123201 can be directly applied only when the unit rectangular hexahedron is a regular hexahedron. Upon implementing color conversion by a digital computation processing apparatus, the limitation of a unit rectangular hexahedron to a regular hexahedron cannot be ignored in implementation of a conversion processing apparatus.

This limitation will be described in detail below. In a conversion processing apparatus that performs digital processing, in order to convert all unit rectangular hexahedra into regular hexahedra, the grid spacing is limited, and the conversion precision and data size (the number of grid points) cannot be optimized. For example, if input data is 8-bit data (0 to 255), the grid spacing must be set at one of 85 (the number of grid points=4), 51 (6), 17 (16), 15 (18), 5 (32), and 3 (86) to convert all unit rectangular hexahedra into regular hexahedra.

On the other hand, since the color space is not uniform in the entire area, it is effective for improving the conversion precision of a specific area to intentionally set a small grid spacing of that area. For example, upon conversion from RGB to CMYK, a gray level drop between grids arising from an undercolor removal (UCR) process readily occurs in a dark area, i.e., (R, G, B)=(0, 0, 0). However, this problem can be effectively solved by setting a small grid spacing of that area. Japanese Patent Laid-Open Nos. 7-131668, 10-70669, and the like disclose schemes for improving the conversion precision of a specific color area by setting a small grid spacing. However, the schemes described in these references require an area discrimination process for changing the processes depending on the areas of input color information, and are inferior to the technique disclosed in Japanese Patent Laid-Open No. 53-123201 above in terms of the processing speed and circuit scale.

SUMMARY OF THE INVENTION

It is an object of the present invention to provide a data conversion method suitable for digital computation processing, and a data conversion apparatus using the method.

In order to achieve the above object, the preferred embodiment of the present invention discloses a data conversion method comprising the steps of: outputting a value which represents distance from an input value to a grid pint of a look-up table, and is normalized by a sufficiently large value, using the look-up table; and executing data conversion of the input value by interpolating the value obtained by the look-up table.

It is another object of the present invention to provide a recording medium used in the data conversion.

In order to achieve the above object, the preferred embodiment of the present invention discloses a computer readable medium recorded data which is used in a data conversion process, the data comprising: table data for outputting a value which represents distance from a grid point of a look-up table to an input value, and is normalized by a sufficiently large value, with respect to the input value; and data representing a computation for executing data conversion of the input value by interpolating the value obtained by the look-up table, using the value obtained by the table data.

It is still another object of the present invention to provide an image processing apparatus and method that use the data conversion.

In order to achieve the above object, the preferred embodiment of the present invention discloses an image processing method comprising the steps of: selecting a plurality of grid points on the basis of input data; obtaining values, which represent distances between the selected grid points and the input data, and are normalized by a predetermined value; and executing interpolation on the basis of the obtained values and data of the plurality of grid points.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiment of a data conversion apparatus and method according to the present invention will be described in detail hereinafter with reference to the accompanying drawings.

Problems in Tetrahedral Interpolation

In order to clarify problems posed when the interpolation (tetrahedral interpolation) disclosed in Japanese Patent Laid-Open No. 53-123201 is implemented by a digital computation processing apparatus and is applied to an LUT in which the grid spacings are not equal in all dimensions, the following explanation will be given taking two-dimensional interpolation as an example. As a scheme used in the interpolation to be described below, tetrahedral interpolation in a three-dimensional space disclosed in Japanese Patent Laid-Open No. 53-123201 is generalized and adapted to a two-dimensional space, and problems in the following example become more conspicuous in three-dimensional tetrahedral interpolation. Note that the description will be made in reference to a two-dimensional space to simplify the drawings, and to make it easy to understand the drawings.

Figure 1:
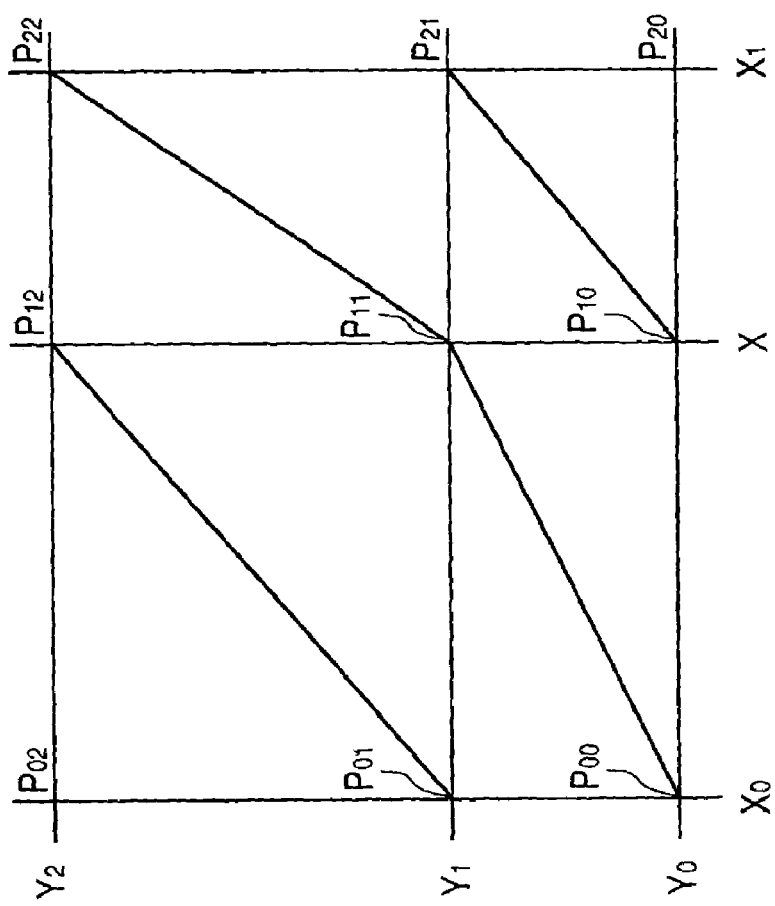
FIG. 1 shows the entire two-dimensional LUT.
Figure 2:
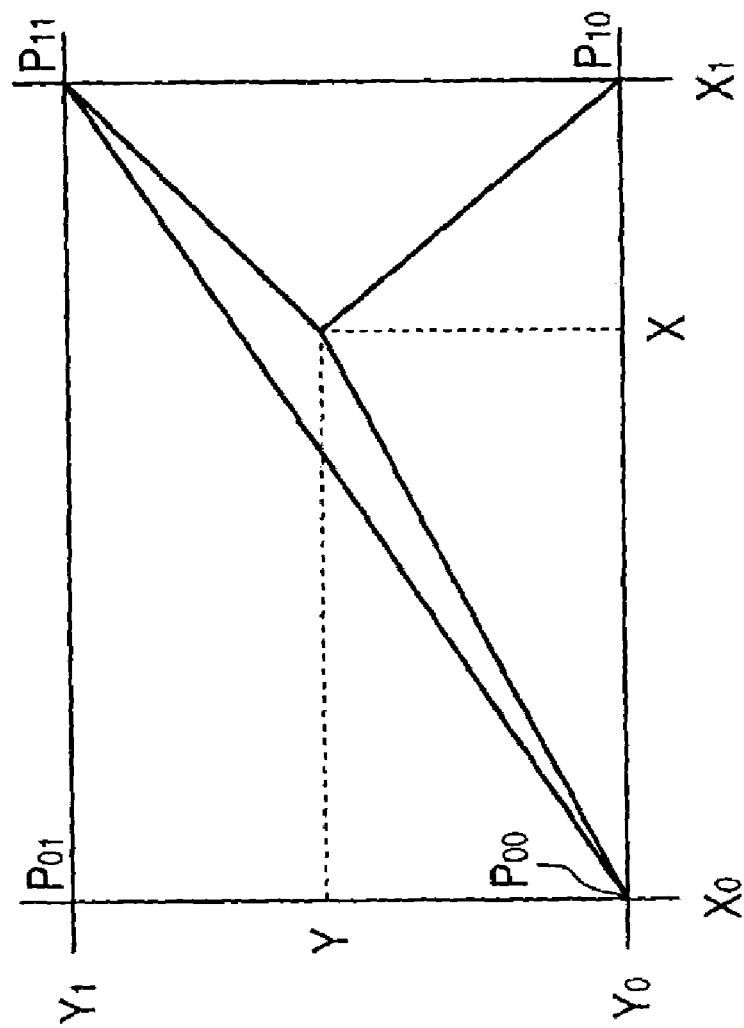
FIG. 2 shows a given unit rectangle extracted from the two-dimensional LUT shown in FIG. 1.

FIG. 1 shows the entire two-dimensional LUT, and FIG. 2 shows a given unit rectangle extracted from the two-dimensional LUT. Note that a unit rectangular hexahedron in three-dimensional tetrahedral interpolation becomes a unit rectangle in the two-dimensional space.

Interpolation in the two-dimensional space is done by checking which of triangles P00-P10-P11 and P00-P01-P11 includes an input point, and multiplying a value (grid value) at the vertex of the triangle that includes the input point by a weight. Assuming that P00=P(X0, Y0), P10=P(X1, Y0), P01=P(X0,Y1), and P11=P(X1,Y1) (X1–X0'Y1–Y0), a process for calculating an output P for an input point (X, Y) that satisfies X0≦X≦X1 and Y0≦Y≦Y1 will be explained below.

If u and v are defined by:

$$u = \frac{(X - X0)}{(X1 - X0)} \quad (1a)$$

$$v = \frac{(Y - Y0)}{(Y1 - Y0)} \quad (1b)$$

which of the triangles includes the input point (X, Y) is determined by comparing u and v, and a grid value used in interpolation differs.

Case 1: if u>v, the input point (X, Y) is include din triangle P00-P10-P11. Hence the output P is given by:

$$P = \frac{(X1 - X)(Y1 - Y0)P00 + \{(X - X0)(Y1 - Y0) - (X1 - X0)(Y - Y0)\}P10 + (X1 - X0)(Y - Y0)P11}{(X1 - X0)(Y1 - Y0)} \quad (2a)$$

Case 2: if v>u, the input point (X, Y) is included in triangle P00-P01-P11. Hence, the output P is given by:

$$P = \frac{(X1 - X0)(Y1 - Y)P00 + \{(X1 - X0)(Y - Y0) - (X - X0)(Y1 - Y0)\}P01 + (X - X0)(Y1 - Y0)P11}{(X1 - X0)(Y1 - Y0)} \quad (2b)$$

Case 3: if u=v, the input (X, Y) is included in line segment P00-P11. Hence, the output P is given by:

$$P = \frac{(X1 - X)P00 + (X - X0)P11}{X1 - X0} \quad (2c)$$

Since equation (2c) is equivalent to equation (2a) or (2b) when u=v, case 3 can be included in case 1 or 2. If (X1-X0)=(Y1-Y0), i.e., if the unit rectangle is a square, equations (2a) and (2b) are greatly simplified as:

$$P = \frac{(X1 - X)P00 + \{(X - X0) - (Y - Y0)\}P10 + (Y - Y0)P11}{X1 - X0} \quad (2a')$$

$$P = \frac{(Y1 - Y)P00 + \{(Y - Y0) - (X - X0)\}P10 + (X - X0)P11}{X1 - X0} \quad (2b')$$

In this manner, when the unit rectangle is a square in tetrahedral interpolation in a two-dimensional space, calculations of the output P do not require any multiplication like (X1-X0) (Y1-Y), the computation volume can be greatly reduced. Likewise, even in tetrahedral interpolation in a three-dimensional space, if the unit rectangular hexahedron is a regular hexahedron, the computation volume upon calculating the output P can be reduced. However, if the unit rectangular hexahedron is not a regular hexahedron, calculations of one output P require multiplications like (X1-X0) (Y1-Y0) (Z1-Z0). Hence, the computation volume increases considerably, and an apparatus that can attain high-speed processing and has a large circuit scale is required.

Of course, if floating point computations are made in digital processing, equation (2a) is rewritten as:

$$P=(1-XX)P00+(XX-YY)P10+YY \times P11 \quad (2a'')$$

for

XX is a real number given by $$XX=(X-X0)/(X1-X0)(0 \leq XX \leq 1) \quad (3a)$$

YY is a real number given by $$YY=(Y-Y0)/(Y1-Y0)(0 \leq YY \leq 1) \quad (3b)$$

Hence, even when (X1-X0)≠(Y1-Y0), equation (2a) can be simplified as equation (2a').

However, floating point computations require a considerably longer processing time than integer computations, and also a huge circuit scale. For this reason, floating point computations of equation (2a'') often increases the processing time and circuit scale compared to integer computations of equation (2a), and high-speed interpolation cannot be implemented by a simple circuit.

Linear Interpolation

The basic principle of this embodiment will be explained below taking as an example a case wherein this embodiment is applied to simplest, linear interpolation.

Figure 3:
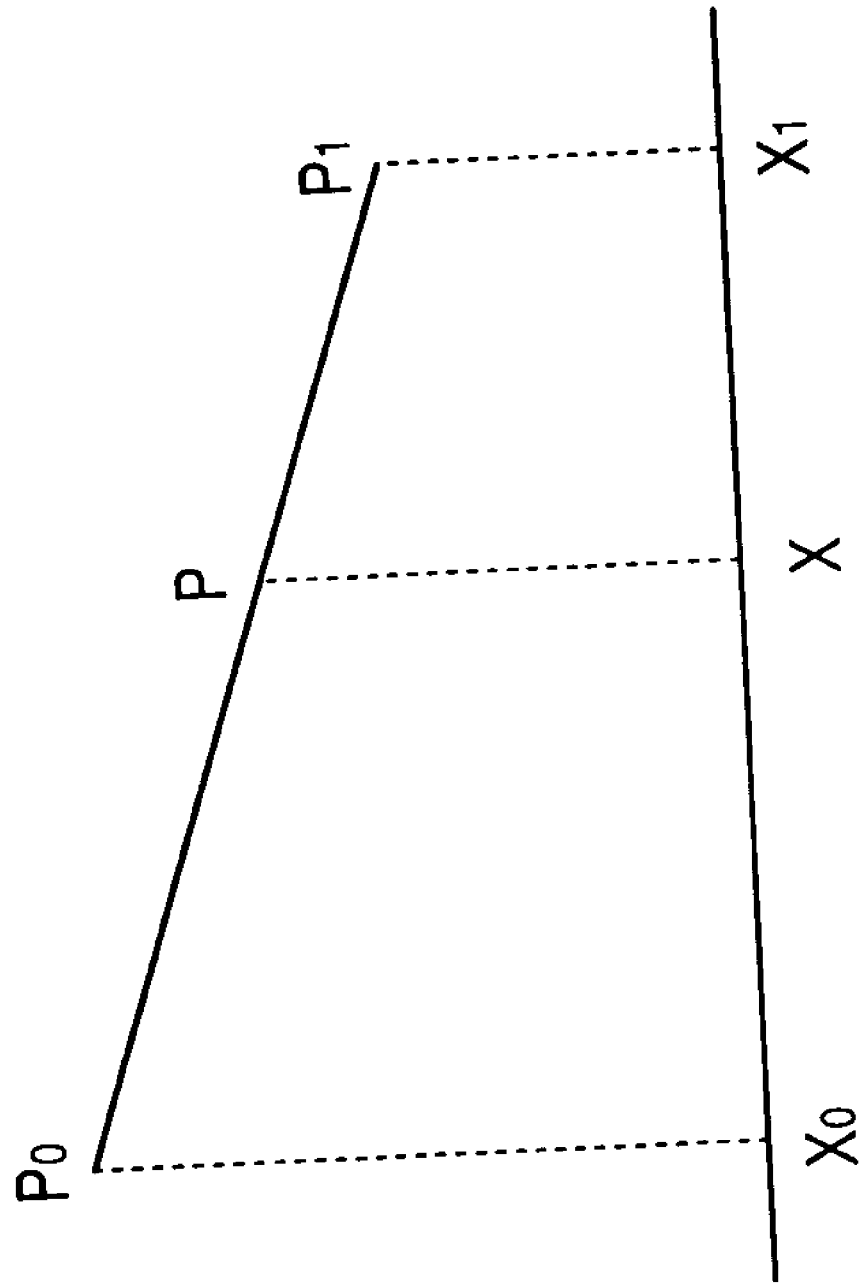
FIG. 3 is a view showing the principle of linear interpolation in case of one dimension.

Given P0=P(X0) and P1=P(X1), as shown in FIG. 3, if linear interpolation is done, an output P for an input point X that satisfies X0≦X≦X1 is given by:

$$P = \frac{(X1-X)P0 + (X-X0)P1}{X1-X0} \quad (4)$$

However, in equation (4), individual values (X1-X0), (X1-X), and (X-X0) have no bearing, but the ratios of two values, i.e., (X1-X)/(X1-X0) and (X-X0)/(X1-X0) have bearing as weights. Hence, if u is calculated using an arbitrary value L by:

$$u = \frac{X-X0}{X1-X0}L \quad (5)$$

equation (4) is rewritten using u as:

$$P = \frac{(L-u)P0 + u \times P1}{L} \quad (6)$$

When equations (5) and (6) are calculated by floating point computations, u becomes a real number, and equations (6) and (4) are equivalent to each other. However, it is inappropriate to make floating point computations; as described above. For this reason, when equivalent processes are done by integer computations, u obtained by equation (5) is an approximate value. Hence, computations done by an actual apparatus are accurately expressed by:

$$u' = \text{ROUND}\left(\frac{X-X0}{X1-X0}L\right) \quad (5')$$

$$P = \frac{(L-u')P0 + u \times P1}{L} \quad (6')$$

where ROUND(x) is a function of rounding off after the decimal point of real number x.

Hence, the output P obtained by equation (6') does not perfectly match that obtained by equation (4). However, if a value sufficiently larger than (X1-X0) is set as L, that error is negligible in practice. In addition, since L can be independently set except for (X1-X0) and its value, if a power of 2 is set as L, a division in equation (6') can be implemented by a right-shift computation. In general, the shift computation can be processed by a simpler circuit and at higher speed than the division. Therefore, by setting a power of 2 as L, reductions of the processing time and circuit scale can be realized.

Figure 4:
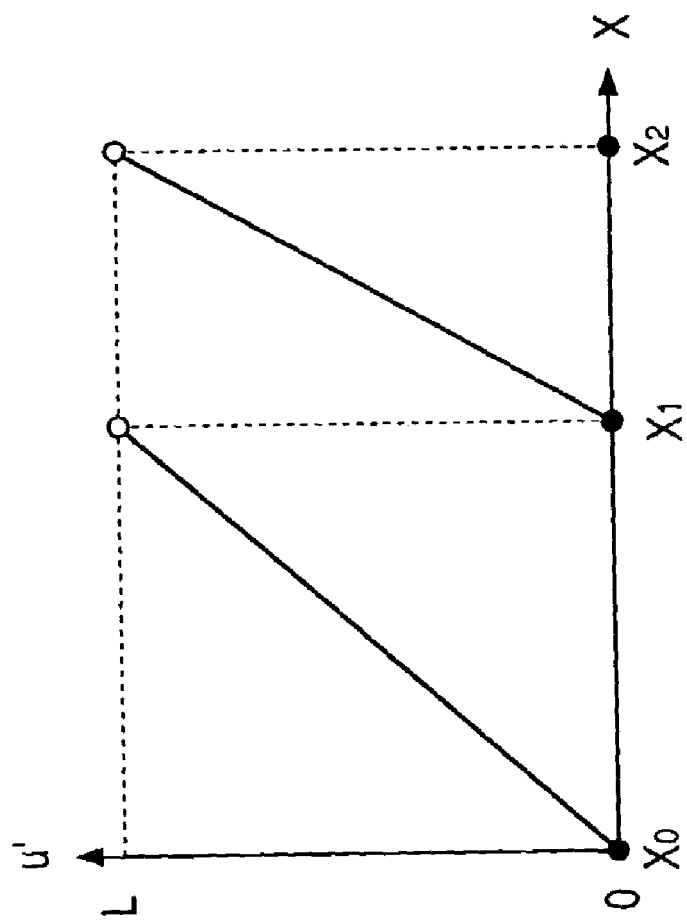
FIG. 4 is a view for explaining the contents of an X-u' table.
Figure 5:
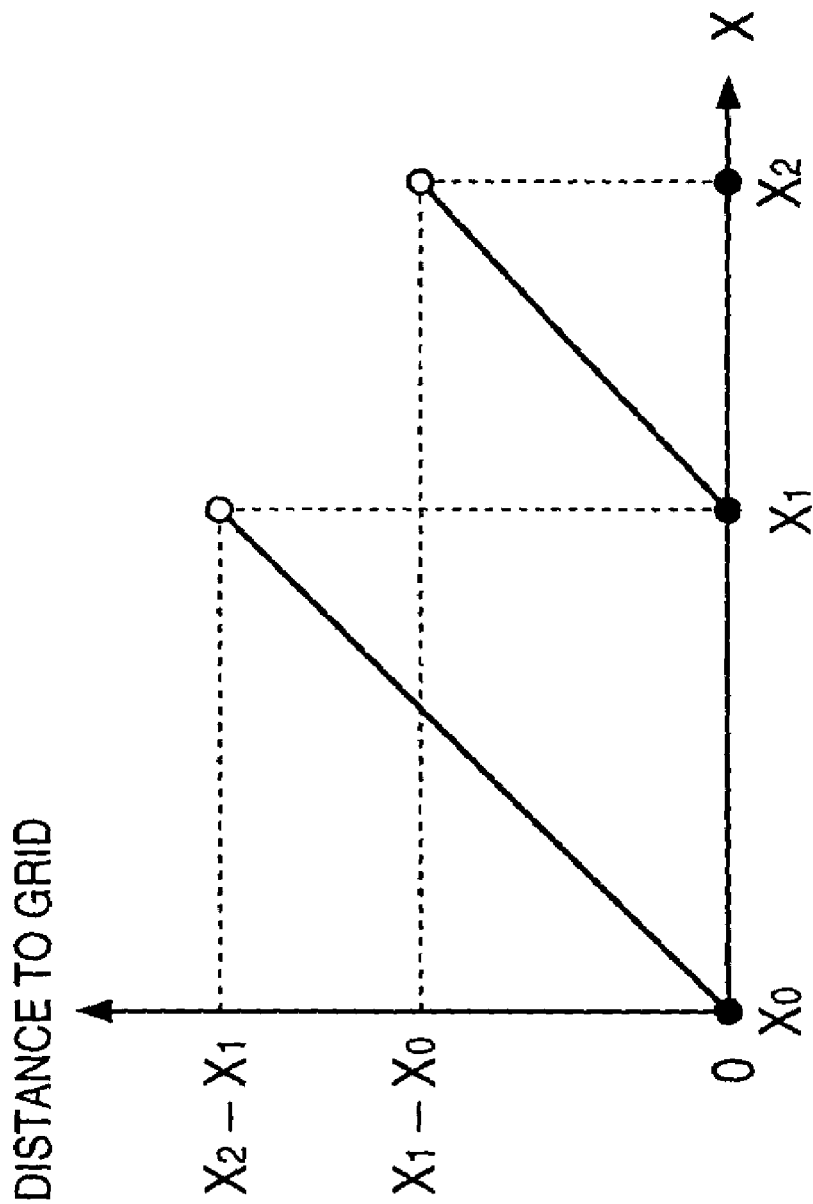
FIG. 5 is a view for explaining the relationship between x and distance to a grid.

Since u' depends only on X, a table that outputs u' using X as an address, i.e., an X-u' table, is created prior to interpolation in actual processing. FIG. 4 shows the contents of the X-u' table as a graph. For the sake of comparison, FIG. 5 shows as a graph the relationship between X and distance to a grid, when L is not used. This X-u' table may be created immediately before execution of interpolation. If grid positions are determined in advance, the X-u' table may be stored in the apparatus in advance in place of the grid positions.

In this manner, if the X-u' table is prepared, the output P for the input X can be calculated by very simple computations using equation (6').

Two-Dimensional Interpolation

In linear interpolation, a division can be replaced by a shift computation, and larger effects can be expected when tetrahedral interpolation is used in a space not less than two dimensions. To demonstrate such effects, the following explanation will be given taking two-dimensional tetrahedral interpolation shown in FIG. 1 as an example. As a scheme used in the following description of the interpolation, tetrahedral interpolation in a three-dimensional space is applied to a two-dimensional space, and the effects in the following example are more conspicuous in the three-dimensional tetrahedral interpolation.

As in u' given by equation (5) in case of one dimension, u' and v' in a two-dimensional space are given by:

$$u' = INT\left(\frac{X-X0}{X1-X0}L\right) \quad (7a)$$

$$v' = INT\left(\frac{Y-Y0}{Y1-Y0}L\right) \quad (7b)$$

The relationships among u and v, and u' and v' are as follows:
if u>v, since uL>vL, INT(uL)≧INT(vL), i.e., u'≧v';
if v>u, since vL>u·L, INT(vL)≧INT(uL), i.e., v'≧u'; and
if u=v, since uL=vL, INT(uL)=INT(vL), i.e., u'=v'.

As can be seen from the above description, by converting u and v into u' and v', the same relationship between u' and v' as that between u and v can be maintained although inequality sign may change to equality sign. Hence, since the triangle that includes the input point remains the same, it is appropriate to calculate the output P based on the relationship between u' and v'. Applying equations (7a) and (7b) to equations (2a) and (2b) yields:
When $$u' > v', P = \frac{(L-u')P00 + (u'-v')P10 + v'P11}{L} \quad (8a)$$

When $$v' \geq u', P = \frac{(L-v')P00 + (v'-u')P01 + u'P11}{L} \quad (8b)$$

As show in equations (8a) and (8b), interpolation for arbitrary grid spacings can be implemented by a computation volume equivalent to that required when the grid spacings are equal to each other in equations (2a') and (2b'), i.e., when the unit rectangle is a square. Of course, when L is a power of 2, divisions by L in equations (8a) and (8b) can be implemented by right-shift computations.

Three-Dimensional Interpolation

Figure 6:
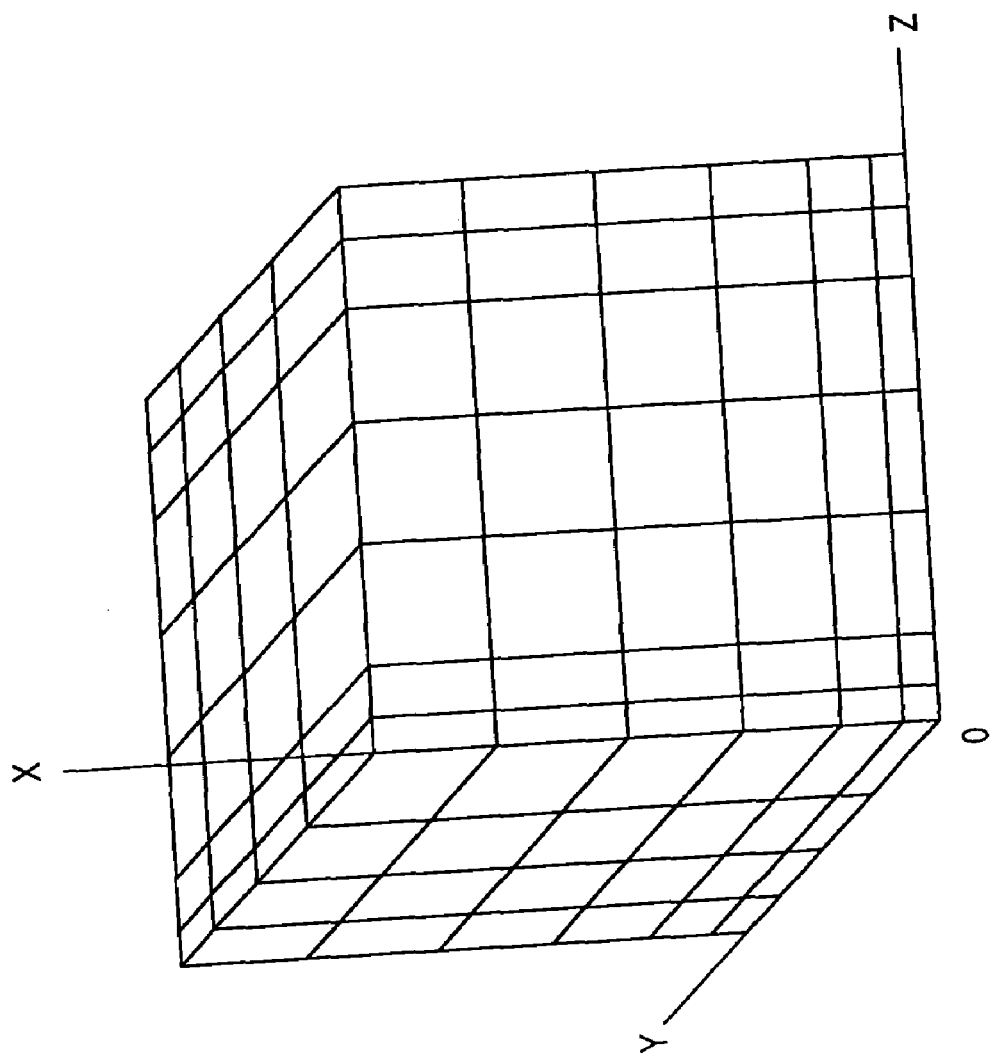
FIG. 6 shows the overall image of a three-dimensional LUT.
Figure 7:
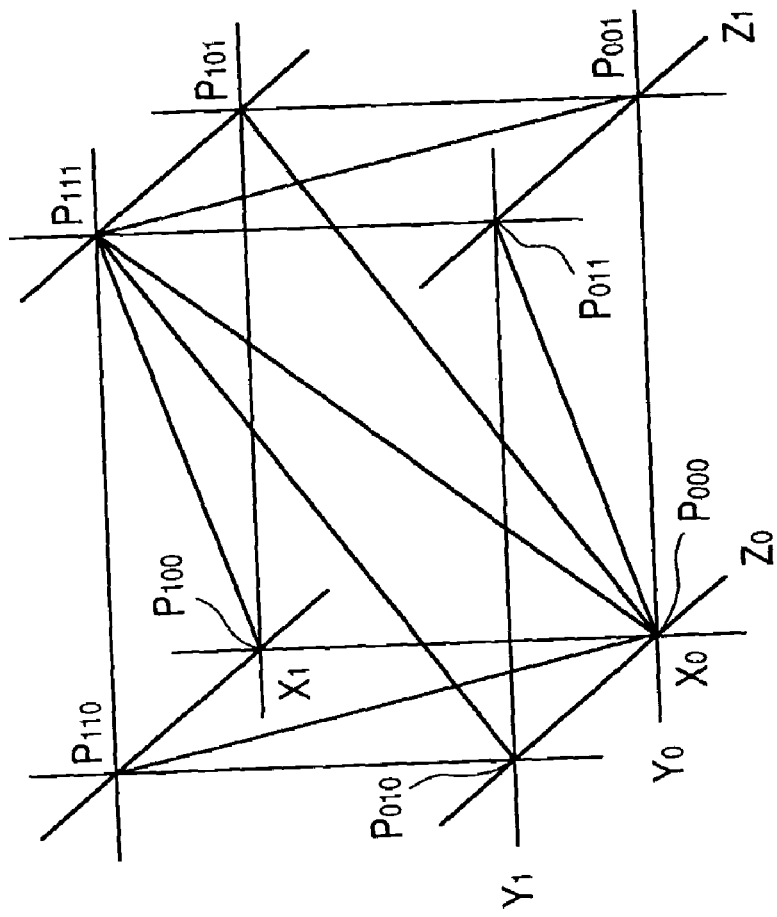
FIG. 7 shows a unit rectangular hexahedron as a part of the three-dimensional LUT shown in FIG. 6.

The processing sequence upon application of this embodiment to tetrahedral interpolation using a three-dimensional LUT will be explained below. FIG. 6 shows the entire image of a three-dimensional LUT, and FIG. 7 shows a unit rectangular hexahedron as a part of the three-dimensional LUT shown in FIG. 6.

Assuming that P000=P(X0,Y0, Z0), P001=P(X0,Y0, Z1), P010=P(X0,Y1, Z0), P011=P(X0,Y1, Z1), P100=P(X1,Y0, Z0), P101=P(X1,Y0, Z1), P110=P(X1,Y1, Z0), and P111=P(X1,Y1, Z1), the effects obtained upon applying this embodiment to three-dimensional tetrahedral interpolation will be explained taking as an example the process for calculating an output P for an input (X, Y, Z) that satisfies X0≦X≦X1, Y0≦Y≦Y1, and Z0≦Z≦Z1.

$$u' = INT\left(\frac{X - X0}{X1 - X0}L\right) \quad (9a)$$

$$v' = INT\left(\frac{Y - Y0}{Y1 - Y0}L\right) \quad (9b)$$

$$w' = INT\left(\frac{Z - Z0}{Z1 - Z0}L\right) \quad (9c)$$

As in the case of the two-dimensional interpolation mentioned above, since u' depends only on X, an X-u' table as a table for obtaining u' using X as an address is created prior to interpolation. Likewise, a Y-v' table that obtains v' using Y as an address, and a Z-w' table that obtains w' using Z as an address are created prior to interpolation. These tables may be created immediately before execution of interpolation. When X, Y, and Z grid positions are determined in advance, the X-u', Y-v', and Z-w' tables may be stored in the apparatus in place of the grid positions. If these tables are created, the output P for the input (X, Y, Z) can be calculated very simply by:

When $$u' > v' > w', P = \frac{(L-u')P000 + (u'-v')P100 + (v'-w')P110 + w'P111}{L} \quad (10a)$$

When $$u' > w' \geq v', P = \frac{(L-u')P000 + (u'-w')P100 + (w'-v')P110 + v'P111}{L} \quad (10b)$$

When $$w' \geq u' > v', P = \frac{(L-w')P000 + (w'-u')P001 + (u'-v')P101 + v'P111}{L} \quad (10c)$$

When $$w' \geq v' \geq u', P = \frac{(L-w')P000 + (w'-v')P001 + (v'-u')P011 + u'P111}{L} \quad (10d)$$

When $$v' > w' \geq u', P = \frac{(L-v')P000 + (v'-w')P010 + (w'-u')P011 + u'P111}{L} \quad (10e)$$

When $$v' \geq u' > w', P = \frac{(L-v')P000 + (v'-u')P010 + (u'-w')P110 + w'P111}{L} \quad (10f)$$

As described above, according to this embodiment, since interpolation in the three-dimensional LUT can be implemented by simple computations, high-speed processing can be easily realized.

In the above description, a linear output is obtained. However, since the processing of this embodiment independently processes the respective output dimensions independently of the number of dimensions, this embodiment can be applied to conversion of an arbitrary output dimension.

The actual three-dimensional LUT is composed of a plurality of unit rectangular hexahedra, as shown in FIG. 6, and the shape of each unit rectangular hexahedron is determined by the grid position with respect to the respective dimensions. This embodiment can be directly applied to interpolation using an LUT in which the grid positions of a three-dimensional input are independently set, as shown in FIG. 6. However, if the same grid positions are set for all the dimensions, since the X-u' table can be used as the Y-v' and Z-w' tables, the processes for preparing these tables and a memory for storing them can be omitted. When this embodiment is applied to color conversion, if the input is one of RGB, CMY, and CIE XYZ of color spaces, the diagonal line of the LUT can be expressed by a gray line by setting grid positions of all the dimensions at identical positions, the precision of gray line interpolation can be improved. As described above, when the grid positions of all the dimensions are set at identical positions, since table preparation and a memory for storing the tables can be omitted, this embodiment can provide greater effects.

Arrangement of Conversion Apparatus

Figure 8:
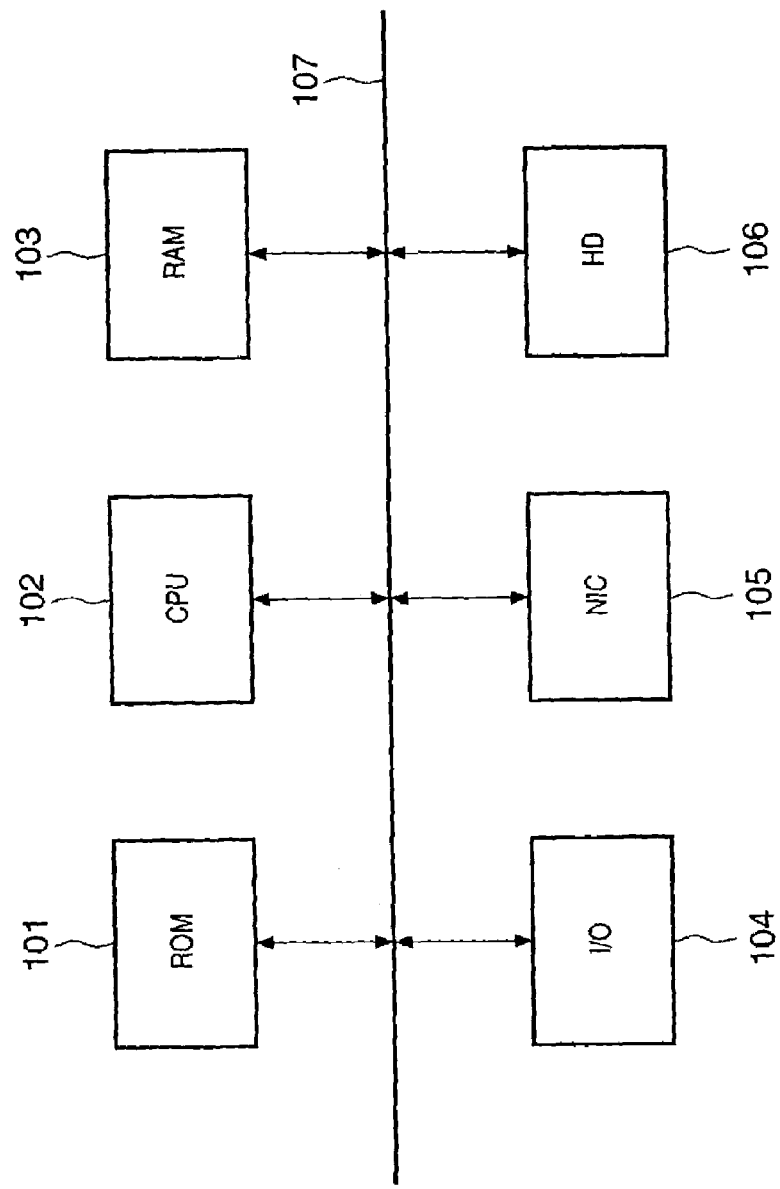
FIG. 8 is a block diagram showing the arrangement of a conventional apparatus.

FIG. 8 is a block diagram showing the arrangement of the conversion apparatus. A CPU 102 controls the operation of the overall conversion apparatus via a bus 107 in accordance with a program and data stored in a ROM 101, executes color conversion according to this embodiment for image data input via, e.g., an I/O 104 or NIC (Network Interface Card) 105 using a RAM 103 as a work memory, and outputs the processing result via the I/O 104 or NIC 105 or stores it in a storage medium such as a hard disk (HD) 107.

For example, to the I/O 104, an image I/O device such as a monitor (CRT, LCD, or the like), printer, image reader, film reader, digital still camera, digital video camera, or the like, or a storage device having a storage medium such as a magnetic disk, optical disk, or the like is connected via a predetermined interface. Also, the apparatus can exchange image data with a computer to which such image I/O device or storage device is connected, via the NIC 105. As such network, a network using Ethernet or FDDI (Fiber Distributed Data Interface), and serial buses specified by IEEE1394, USB (Universal Serial Bus), and the like are available.

Figure 9:
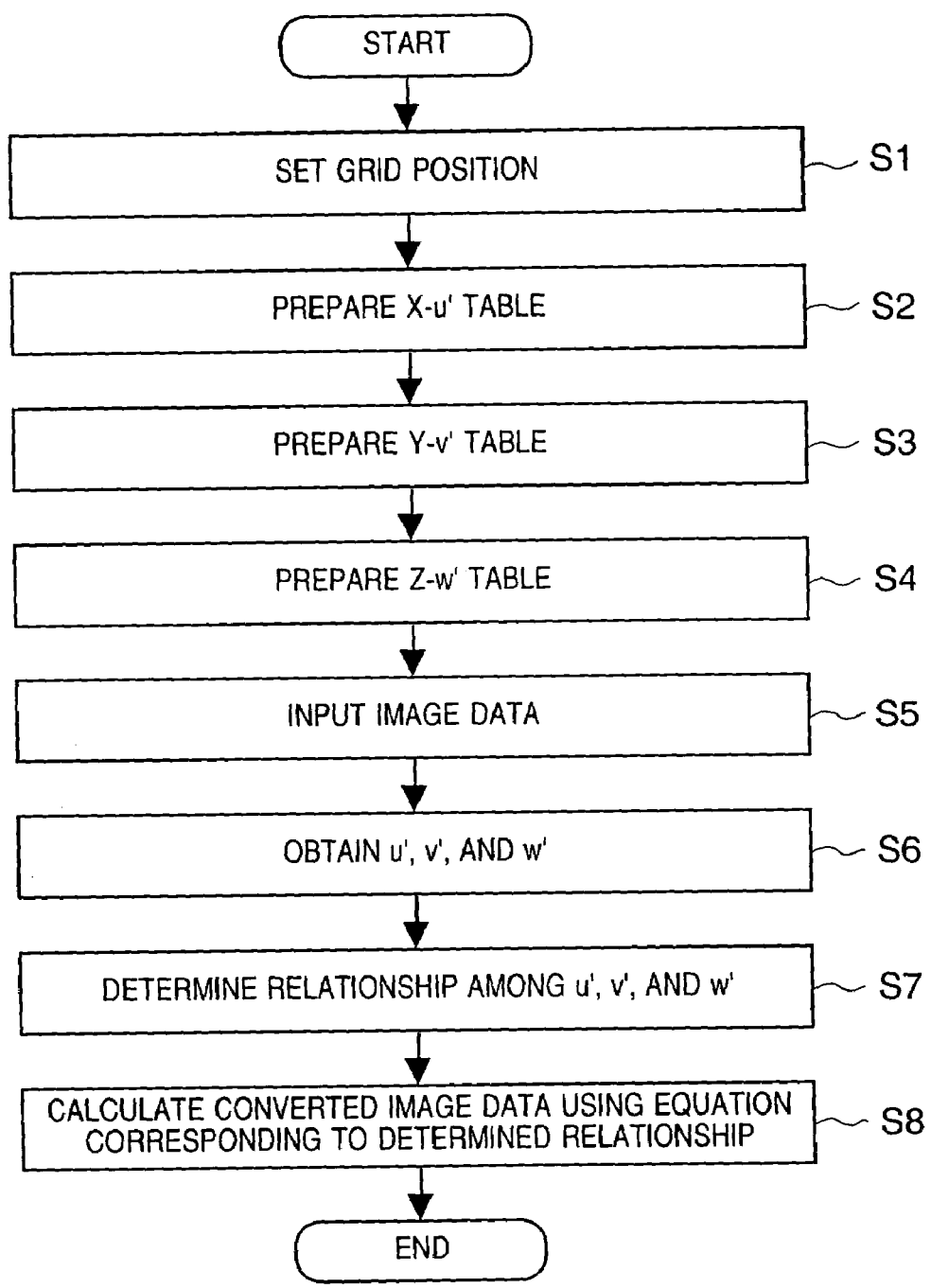
FIG. 9 is a flow chart showing a conversion process.

FIG. 9 is a flow chart showing conversion executed by the CPU 102. After a grid position is set in step S1, X-u', Y-v', and Z-w' tables are prepared in steps S2 to S4. The prepared tables are stored in, e.g., the RAM 103.

Subsequently, image data is input in step S5, and u', v', and w' corresponding to the input image data are obtained using the prepared tables in step S6. The relationship among u', v', and w' is determined in step S7, and converted image data is calculated using an equation corresponding to the determination result, i.e., one of equations (10a) to (10f) in step S8. Steps S5 to S8 are repeated until all conversion processes of the image data are complete (not shown in FIG. 9).

FIG. 8 shows an example wherein the conversion apparatus of this embodiment is implemented by a computer such as a personal computer. However, this embodiment is not limited to such specific apparatus. For example, a DSP (Digital Signal Processor) may be provided in addition to the CPU 102, a program that implements the conversion shown in FIG. 9 may be supplied to the DSP, and the DSP may execute the conversion. Furthermore, the conversion apparatus of this embodiment may be built in an image forming apparatus such as a printer, copying machine, or the like. In this case, X-u', Y-v', and Z-w' tables may be stored in an LUT RAM connected to an image data bus, and the conversion result may be computed by, e.g., a DSP on the basis of the outputs from the RAM, and may be output onto the image data bus. When the conversion process of this embodiment is applied to an image forming apparatus, that conversion process corresponds to various processes such as input masking, luminance-gray level conversion, UCR, output masking, gamma correction, gradation correction, color space conversion, color space compression/expansion, and the like.

As described above, according to this embodiment, since a look-up table that obtains distance, which is normalized by a sufficiently large numerical value, from a grid point to an input value using the input value as an address is used, interpolation with practically high precision can be implemented by a computation volume equal to that required when all the grid spacings are equal to each other without limiting setups of grid positions. Hence, according to the conversion apparatus of this embodiment, flexible conversion characteristics can be implemented without increasing the computation volume and circuit scale.

This embodiment can especially reduce multiplications required for calculating weights when the input has two or more dimensions and the interpolation scheme is tetrahedral interpolation, thus effectively shortening the processing time and reducing the circuit scale.

When a power of 2 is set as the sufficiently large numerical value for normalizing the distance between the input value and grid point, since divisions by all the weights done at the end of interpolation can be implemented by shift computations, thus further shortening the processing time and reducing the circuit scale.

Furthermore, when the grid positions for all the dimensions of the input are equal to each other, the processing steps and memory size required for implementing the present invention can be further reduced.

Note that this embodiment is particularly effective to improve gray line interpolation precision, when the color space of the input is one of RGB, CMY, and CIE XYZ.

To restate, according to the present invention, a data conversion method suitable for digital computation processing, a data conversion apparatus using the method, a recording medium used in the data conversion, and an image processing apparatus and method using the data conversion can be provided.

As many apparently widely different embodiments of the present invention can be made without departing from the spirit and scope thereof, it is to be understood that the invention is not limited to the specific embodiments thereof except as defined in the appended claims.

What is claimed is:

1. A color conversion method of converting three-dimensional input data representing an image by using a three-dimensional look-up table having rectangularly spaced grid points, grid positions of the three-dimensional look-up table having non-uniform intervals, the method comprising the step of performing interpolation processing using four grid points in eight grid points (P000=P(X0, Y0, Z0), P001=P(X0, Y0, Z1), P010=(X0, Y1, Z0), P011=P(X0, Y1, Z1), P100=P(X1, Y0, Z0), P101=P(X1, Y0, Z1), P110=P(X1, Y1, Z0), P111=P(X1, Y1, Z1) of a unit rectangular hexahedron which includes an input data value (X, Y, Z where $X0 \leq X \leq X1$, $Y0 \leq Y \leq Y1$, $Z0 \leq Z \leq Z1$), wherein the interpolation processing comprises the steps of:

obtaining weight values (u', v', w'), based on the input data value (X, Y, Z), wherein the weight values are expressed as follows:

$u'=\text{INT}(((X-X0)/(X1-X0))L)$, $v'=\text{INT}(((Y-Y0)/(Y1-Y0))L)$, $w'=\text{INT}(((Z-Z0)/(Z1-Z0))L)$, where a value of a predetermined constant (L) is greater than each of the grid intervals (X1-X0, Y1-Y0, Z1-Z0) of the three-dimensional look-up table, and is a power of 2;

determining a relationship among the weight values (u', v', w');

calculating a value of the output data (P) for the input data value by tetrahedral interpolation using the output values for the four grid points and the weight values, based on determining result by the following equations:

when $u'>v'>w'$, $P=((L-u')P000+(u'-v')P100+(v'-w')P110+w'P111)/L$, when $u'>w'>v'$, $P=((L-u')P000+(u'-w')P100+(w'-v')P101+v'P111)/L$, when $w'>u'>v'$, $P=((L-w')P000+(w'-u')P001+(u'-v')P101+v'P111)/L$, when $w'>v'>u'$, $P=((L-w')P000+(w'-v')P001+(v'-u')P011+u'P111)/L$, when $v'>w'>u'$, $P=((L-v')P000+(v'-w')P010+(w'-u')P011+u'P111)/L$, when $v'>u'>w'$, $P=((L-v')P000+(v'-u')P010+(u'-w')P110+w'P111)/L$; and displaying a color converted image represented by the output data.

2. The method according to claim 1 wherein the grid positions corresponding to each dimension are set the same.

3. The method according to claim 1 wherein the input data is expressed in one of RGB, CMY, and XYZ color spaces.

4. The method according to claim 1 further comprising the steps of:

setting grid positions of the tree-dimensional look-up table; and generating X-u', Y-v', and Z-w' tables to obtain the weight values (u', v', w') in the obtaining step.

5. The method according to claim 1 wherein the color converted image is displayed by using a printer.

6. The method according to claim 1 wherein the color converted image is displayed by a monitor.

7. A data conversion apparatus for performing color conversion processing on three-dimensional input data representing an image by using a three-dimensional look-up table having rectangularly spaced grid points, grid positions of the three-dimensional look-up table having non-uniform intervals, said apparatus comprising a processor arranged to perform interpolation processing using four grid points in eight grid points (P000=P(X0, Y0, Z0), P001=P(X0, Y0, Z1), P010=(X0, Y1, Z0), P011=P(X0, Y1, Z1), P100=P(X1, Y0, Z0), P101=P(X1, Y0, Z1), P110=P(X1, Y1, Z0), P111=P(X1, Y1, Z1)) of a unit rectangular hexahedron which includes an input data value (X, Y, Z where $X0 \leq X \leq X1$, $Y0 \leq Y \leq Y1$, $Z0 \leq Z \leq Z1$), wherein said processor comprises:

an obtainer, arranged to obtain weight values (u', v', w'), based on the input data value (X, Y, Z), wherein the weight values are expressed as follows:

$u' = INT(((X-X0)/(X1-X0))L)$, $v' = INT(((Y-Y0)/(Y1-Y0))L)$, $w' = INT(((Z-Z0)/(Z1-Z0))L)$, where a value of a predetermined constant (L) is greater than each of the grid intervals (X1-X0, Y1-Y0, Z1-Z0) of the three dimensional look-up table, and is a power of 2;

a determiner, arranged to determine a relationship among the weight values (u', v', w');

a calculator, arranged to calculate a value of the output data (P) for the input data value by tetrahedral interpolation using the output values for the four grid points and the weight values, based on determining result by the following equations:

when $u' > v' > w'$, $P=((L-u')P000+(u'-v')P100+(v'-w')P110+w'P111)/L$, when $u' > w' > v'$, $P=((L-u')P000+(u'-w')P100+(w'-v')P101+v'P111)/L$, when $w' > u' > v'$, $P=((L-w')P000+(w'-u')P001+(u'-v')P101+v'P111)/L$, when $w' > v' > u'$, $P=((L-w')P000+(w'-v')P001+(v'-u')P011+u'P111)/L$, when $v' > w' > u'$, $P=((L-v')P000+(v'-w')P010+(w'-u')P011+u'P111)/L$, when $v' > u' > w'$, $P=((L-v')P000+(v'-u')P010+(u'-w')P110+w'P111)/L$; and a display arranged to display a color converted image represented by the output data.

8. A computer-readable storage medium storing computer-executable instructions causing a computer to perform a color conversion function of converting three-dimensional input data representing an image by using a three-dimensional look-up table having rectangularly spaced grid points, grid positions of the three-dimensional look-up table having non-uniform intervals, the color conversion function including performing interpolation processing using four grid points in eight grid points (P000=P(X0, Y0, Z0), P001=P(X0, Y0, Z1), P010=(X0, Y1, Z0), P011=P(X0, Y1, Z1), P100=P(X1, Y0, Z0), P101=P(X1, Y0, Z1), P110=P(X1, Y1, Z0), P111=P(X1, Y1, Z1)) of a unit rectangular hexahedron which includes an input data value (X, Y, Z where $X0 \leq X \leq X1$, $Y0 \leq Y \leq Y1$, $Z0 \leq Z \leq Z1$), wherein the interpolation processing includes:

obtaining weight values (u', v', w'), based on the input data value (X, Y, Z), wherein the weight values are expressed as follows:

$u' = INT(((X-X0)/(X1-X0))L)$, $v' = INT(((Y-Y0)/(Y1-Y0))L)$, $w' = INT(((Z-Z0)/(Z1-Z0))L)$, where a value of a predetermined constant (L) is greater than each of the grid intervals (X1-X0, Y1-Y0, Z1-Z0) of the three-dimensional look-up table, and is a power of 2;

determining a relationship among the weight values (u', v', w');

calculating a value of the output data (P) for the input data value by tetrahedral interpolation using the output values for the four grid points and the weight values, based on determining result by the following equations:

when $u' > v' > w'$, $P=((L-u')P000+(u'-v')P100+(v'-w')P110+w'P111)/L$, when $u' > w' > v'$, $P=((L-u')P000+(u'-w')P100+(w'-v')P101+v'P111)/L$, when $w' > u' > v'$, $P=((L-w')P000+(w'-u')P001+(u'-v')P101+v'P111)/L$, when $w' > v' > u'$, $P=((L-w')P000+(w'-v')P001+(v'-u')P011+u'P111)/L$, when $v' > w' > u'$, $P=((L-v')P000+(v'-w')P010+(w'-u')P011+u'P111)/L$, when $v' > u' > w'$, $P=(L-v')P000+(v'-u')P010+(u'-w')P110+w'P111)/L$; and displaying a color converted image represented by the output data.

* * * * *

UNITED STATES PATENT AND TRADEMARK OFFICE
CERTIFICATE OF CORRECTION

PATENT NO. : 7,397,483 B1
APPLICATION NO. : 09/342917
DATED : July 8, 2008
INVENTOR(S) : Hiroaki Sugiura It is certified that error appears in the above-identified patent and that said Letters Patent is hereby corrected as shown below:

ON THE TITLE PAGE:
    Item (56) Foreign Patent Documents, "JP 8237497 9/1996" should read -- JP 8-237497 9/1996 --.

COLUMN 3:
    Line 30, "$X0 \leqq X \leqq X1$ and $Y0 \leqq Y \leqq Y1$" should read -- $X0 \leq X \leq X1$ and $Y0 \leq Y \leq Y1$ --; and
    Line 48, "include din" should read -- included in --.

COLUMN 4:
    Line 44, "($0 \leqq XX \leqq 1$)" should read -- ($0 \leq XX \leq 1$) --;
    Line 47, "($0 \leqq YY \leqq 1$)" should read -- ($0 \leq YY \leq 1$) --; and
    Line 67, "$X0 \leqq X \leqq X1$" should read -- $X0 \leq X \leq X1$ --.

COLUMN 5:
    Line 27, "computations;" should read -- computations, --.

COLUMN 6:
    Line 28, "if u>v, since uL>vL, INT(uL$\geqq$INT(vL), i.e., u'$\geqq$v';" should read -- if u>v, since uL>vL, INT(uL$\geq$INT(vL), i.e., u'$\geq$v'; --; and
    Line 29, "if v>u, since vL>u·L, INT(vL$\geqq$INT(uL), i.e., v'$\geqq$u';" should read -- if v>u, since vL>u·L, INT(vL$\geq$INT(uL), i.e., v'$\geq$u'; --.

COLUMN 7:
    Line 7, "$X0 \leqq X \leqq X1$," should read -- $X0 \leq X \leq X1$ --;
    Line 8, "$Y0 \leqq Y \leqq Y1$, and $Z0 \leqq Z \leqq Z1$." should read -- $Y0 \leq Y \leq Y1$, and $Z0 \leq Z \leq Z1$. --; and
    Lines 46-49, "$u'>w'\geq v', P = \dfrac{(L-u')P000+(u'-w')P100+(w'-v')P110+v'P111}{}$" should read -- $u'>w'\geq v', P = \dfrac{(L-u')P000+(u'-w')P100+(w'-v')P101+v'P111}{L}$ --.

UNITED STATES PATENT AND TRADEMARK OFFICE
CERTIFICATE OF CORRECTION

PATENT NO. : 7,397,483 B1
APPLICATION NO. : 09/342917
DATED : July 8, 2008
INVENTOR(S) : Hiroaki Sugiura It is certified that error appears in the above-identified patent and that said Letters Patent is hereby corrected as shown below:

COLUMN 10:
    Line 17, "$X0 \leqq X \leqq X1$," should read -- $X0 \leq X \leq X1$, --;
    Line 18, "$Y0 \leqq Y \leqq Y1, Z0 \leqq Z \leqq Z1$)," should read -- $Y0 \leq Y \leq Y1, Z0 \leq Z \leq Z1$), --;
    Line 42, "when u'>w'>v'," should read -- u'>w'≥v', --;
    Lines 45-54, "when w'>u'>v', P=((L-w')P000+(w'-u')P001+(u'-v')P101+v'P111)/L, when w'>v'>u', P=((L-w')P000+(w'-v')P001+(v'-u')P011+u'P111)/L, when v'>w'>u', P=((L-v')P000+(v'-w')P010+(w'-u')P011+u'P111)/L, when v'>u'>w', P=((L-v')P000+(v'-u')P010+(u'-w')P110+w'P111)/L; and" should read -- when w'≥u'>v', P=((L-w')P000+(w'-u')P001+(u'-v')P101+v'P111)/L, when w'≥v'≥u', P=((L-w')P000+(w'-v')P001+(v'-u')P011+u'P111)/L, when v'>w'≥u', P=((L-v')P000+(v'-w')P010+(w'-u')P011+u'P111)/L, when v'≥u'>w', P=((L-v')P000+(v'-u)P010+(u'-w')P110+w'P111)/L --;

Line 57, "claim 1" should read -- claim 1, --;
    Line 59, "claim 1" should read -- claim 1, --; and
    Line 61, "claim 1" should read -- claim 1, --.

COLUMN 11:
    Line 1, "claim 1" should read -- claim 1, --;
    Line 3, "claim 1" should read -- claim 1, --;
    Line 17, "$X0 \leqq X \leqq X1 \leqq Y0 \leqq Y \leqq Y1, Z0 \leqq Z \leqq Z1$)," should read
-- $X0 \leq X \leq X1, Y0 \leq Y \leq Y1, Z0 \leq Z \leq Z1$), --;
    Line 30, "three dimensional" should read -- three-dimensional --;
    Line 43, "when u'>w'>v';" should read -- when u'>w'≥v'; --; and

UNITED STATES PATENT AND TRADEMARK OFFICE
CERTIFICATE OF CORRECTION

PATENT NO. : 7,397,483 B1
APPLICATION NO. : 09/342917
DATED : July 8, 2008
INVENTOR(S) : Hiroaki Sugiura It is certified that error appears in the above-identified patent and that said Letters Patent is hereby corrected as shown below:

Lines 44-54, "when $w'>u'>v'$, $P=((L-w')P000+(w'-u')P001+(u'-v')P101+v'P111)/L$, when $w'>v'>u'$, $P=((L-w')P000+(w'-v')P001+(v'-u')P011+u'P111)/L$, when $v'>w'>u'$, $P=((L-v')P000+(v'-w')P010+(w'-u')P011+u'P111)/L$, when $v'>u'>w'$, $P=((L-v')P000+(v'-u')P010+(u'-w')P110+w'P111)/L$; and" should read -- when $w'\geq u'>v'$, $P=((L-w')P000+(w'-u')P001+(u'-v')P101+v'P111)/L$, when $w'\geq v'\geq u'$, $P=((L-w')P000+(w'-v')P001+(v'-u')P011+u'P111)/L$, when $v'>w'\geq u'$, $P=((L-v')P000+(v'-w')P010+(w'-u')P011+u'P111)/L$, when $v'\geq u'>w'$, $P=((L-v')P000+(v'-u')P010+(u'-w')P110+w'P111)/L$; and --.

COLUMN 12:
Line 15, "$X0\leqq X\leqq X1, Y0\leqq Y\leqq Y1$," should read -- $X0\leq X\leq X1, Y0\leq Y\leq Y1$, --;

Line 16, "$Z0\leqq Z\leqq Z1)$," should read -- $Z0\leq Z\leq Z1)$, --;

Line 38, "when $u'>w'>v'$;" should read -- when $u'>w'\geq v'$; --; and

Lines 42-50, "when $w'>u'>v'$, $P=((L-w')P000+(w'-u')P001+(u'-v')P101+v'P111)/L$, when $w'>v'>u'$, $P=((L-w')P000+(w'-v')P00l+(v'-u')P011+u'P111)/L$, when $v'>w'>u'$, $P=((L-w')P000+(v'-w')P010+(w'-u')P011+u'P111)/L$, when $v'>u'>w'$, $P=((L-v')P000+(v'-u')P010+(u'-w')P110+w'P111)/L$; and" should read

UNITED STATES PATENT AND TRADEMARK OFFICE
CERTIFICATE OF CORRECTION

PATENT NO. : 7,397,483 B1
APPLICATION NO. : 09/342917
DATED : July 8, 2008
INVENTOR(S) : Hiroaki Sugiura It is certified that error appears in the above-identified patent and that said Letters Patent is hereby corrected as shown below:

-- when $w' \geq u' > v'$, $P=((L-w')P000+(w'-u')P001+(u'-v')P101+v'P111)/L$, when $w' \geq v' \geq u'$, $P=((L-w')P000+(w'-v')P001+(v'-u')P011+u'P111)/L$, when $v' > w' \geq u'$, $P=((L-v')P000+(v'-w')P010+(w'-u')P011+u'P111)/L$, when $v' \geq u' > w'$, $P=((L-v')P000+(v'-u')P010+(u'-w')P110+w'P111)/L$ --.

Signed and Sealed this

Seventh Day of April, 2009

JOHN DOLL
*Acting Director of the United States Patent and Trademark Office*